US012689851B2

(12) United States Patent
Lombardi et al.

(10) Patent No.: US 12,689,851 B2
(45) Date of Patent: Jul. 21, 2026

(54) MAGNETICALLY SELF-SHIELDED SPEAKER BOX FOR A MOBILE DEVICE

(71) Applicant: Google LLC, Mountain View, CA (US)

(72) Inventors: Michael J. Lombardi, South Barrington, IL (US); Fuk Kiu Lee, Cupertino, CA (US); Joseph L. Allore, Mundelein, IL (US); Meiling Zhang, Apex, NC (US)

(73) Assignee: Google LLC, Mountain View, CA (US)

( * ) Notice: Subject to any disclaimer, the term of this patent is extended or adjusted under 35 U.S.C. 154(b) by 140 days.

(21) Appl. No.: 18/835,560

(22) PCT Filed: Oct. 13, 2023

(86) PCT No.: PCT/US2023/076861
§ 371 (c)(1),
(2) Date: Aug. 2, 2024

(87) PCT Pub. No.: WO2025/080275
PCT Pub. Date: Apr. 17, 2025

(65) Prior Publication Data
US 2026/0189829 A1 Jul. 2, 2026

(51) Int. Cl.
*H04R 1/02* (2006.01)
*G03B 13/36* (2021.01)
(Continued)

(52) U.S. Cl.
CPC .............. *H04R 1/028* (2013.01); *H04M 1/03* (2013.01); *H04N 23/90* (2023.01); *H04R 1/023* (2013.01);
(Continued)

(58) Field of Classification Search
CPC ........ H04R 1/028; H04R 1/023; H04R 1/025; H04R 2799/11; H04N 23/90; H04N 23/57;
(Continued)

(56) References Cited

U.S. PATENT DOCUMENTS 10,932,022 B2* 2/2021 Yin ......................... H04R 1/021
11,159,891 B2* 10/2021 Kim ...................... H04R 1/028
(Continued)

FOREIGN PATENT DOCUMENTS

CN 205847569 12/2016
WO 2022127710 A1 6/2022

OTHER PUBLICATIONS

"International Search Report and Written Opinion", Application No. PCT/US2023/076861, May 7, 2024, 11 pages.
(Continued)

*Primary Examiner* — Marly S Camargo
(74) *Attorney, Agent, or Firm* — Colby Nipper PLLC

(57) ABSTRACT

The present document describes techniques for a magnetically self-shielded speaker box for a mobile device. The speaker box described herein includes a thin metal enclosure, thereby reducing or eliminating plastic components from the exterior enclosure of the speaker box. The metal of the enclosure has a high magnetic permeability to prevent penetration of a magnetic field generated by the speaker transducer within the exterior enclosure. Also, the exterior enclosure includes at least two enclosure portions that are joined together with a continuous welded seam. Accordingly, the speaker box described herein is a thin-walled, fully metal, high-permeability enclosure resulting in a smaller, self-shielded solution that reduces both (i) the total physical volume of the speaker box for a given internal speaker back
(Continued)

volume and (ii) the spacing requirements to adjacent voice-coil-motor auto-focus camera modules.

20 Claims, 13 Drawing Sheets

(51) Int. Cl.
| | |
|---|---|
| *G06F 1/16* | (2006.01) |
| *H04M 1/03* | (2006.01) |
| *H04N 23/57* | (2023.01) |
| *H04N 23/61* | (2023.01) |
| *H04N 23/90* | (2023.01) |

(52) U.S. Cl.
CPC ............. *H04R 1/025* (2013.01); *G03B 13/36* (2013.01); *H04M 2250/52* (2013.01); *H04R 2499/11* (2013.01)

(58) Field of Classification Search
CPC .......... H04N 23/61; G06F 1/16; G06F 1/605; G06F 1/1686; G06F 1/688; H04M 1/03; H04M 2250/52; G03B 13/36
See application file for complete search history.

(56) References Cited

U.S. PATENT DOCUMENTS

| | | | |
|---|---|---|---|
| 2006/0182304 | A1 | 8/2006 | Takase et al. |
| 2015/0245122 | A1 | 8/2015 | Rayner et al. |
| 2018/0035188 | A1 | 2/2018 | Lim et al. |
| 2018/0279028 | A1 | 9/2018 | Mittleman et al. |
| 2020/0084525 | A1 | 3/2020 | De La Fuente et al. |
| 2020/0169816 | A1 | 5/2020 | Kim et al. |
| 2020/0213693 | A1 | 7/2020 | Mn et al. |
| 2020/0314546 | A1* | 10/2020 | Aleksandrov ........ H04R 1/2865 |
| 2021/0006905 | A1 | 1/2021 | Yan et al. |
| 2021/0067877 | A1* | 3/2021 | Jeon ........................ H04S 1/007 |
| 2021/0227142 | A1* | 7/2021 | Sharma ............. H04N 23/6815 |

OTHER PUBLICATIONS

"Foreign Office Action", EP Application No. 23809016.1, Apr. 28, 2025, 5 pages.

"International Preliminary Report on Patentability", Application No. PCT/US2023/076861, Apr. 7, 2026, 8 pages.

Tsai, Yuting, "Rib-Divided Speaker Back Chamber for Preventing Sound Absorbing Material Accumulation", Technical Disclosure Commons, https://www.tdcommons.org/dpubs_series/9707, Apr. 3, 2026, 11 pages.

\* cited by examiner

100 ⌐

104 ⌐          ⌐ 106

102 ⌐

Electronic Device
102

Camera(s)
104

Earpiece Speaker
106

Magnetically Shielded
Speaker Box
108

Figure 2:
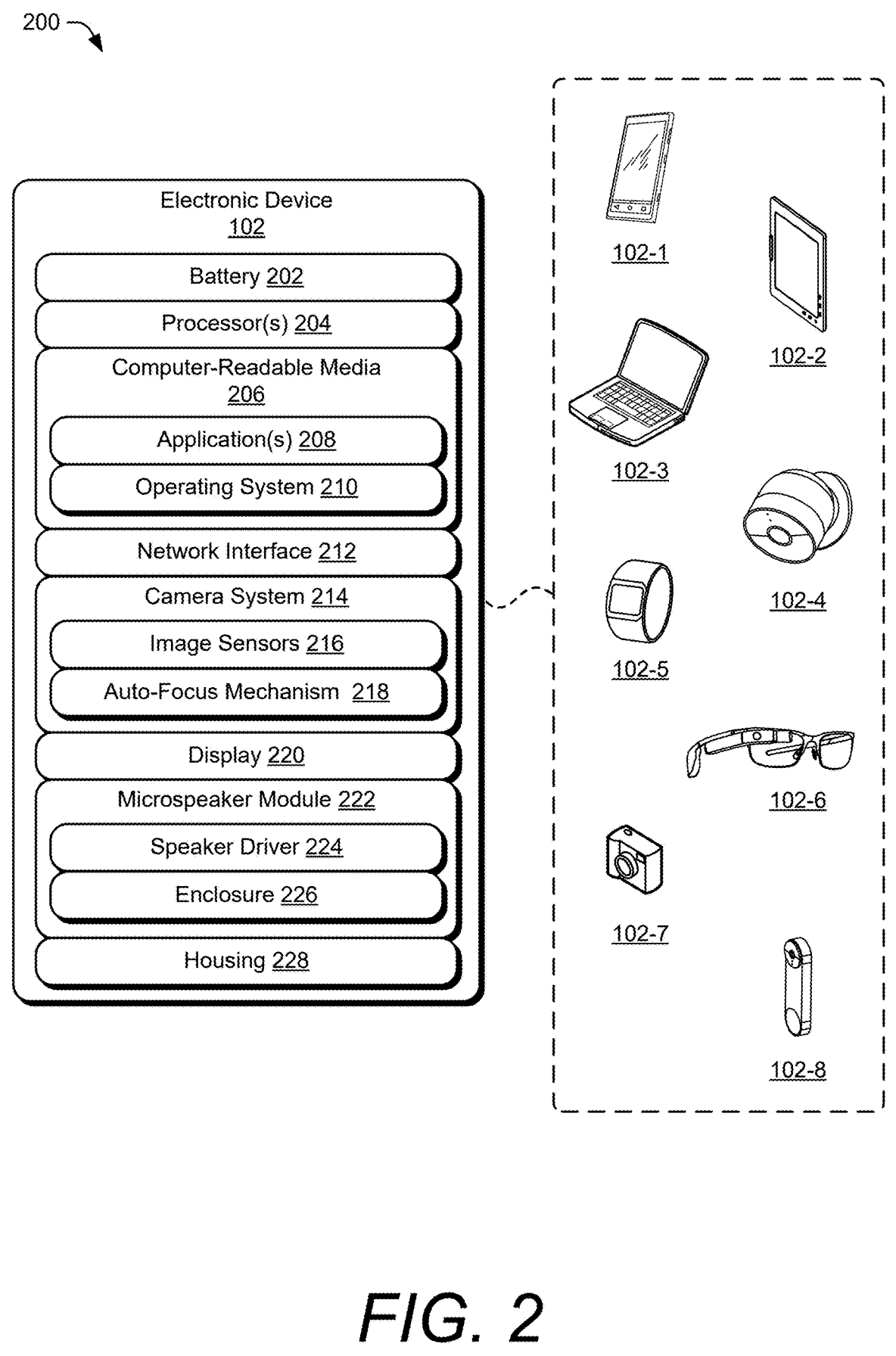

200

Electronic Device
102

Battery 202

Processor(s) 204

Computer-Readable Media
206

Application(s) 208

Operating System 210

Network Interface 212

Camera System 214

Image Sensors 216

Auto-Focus Mechanism 218

Display 220

Microspeaker Module 222

Speaker Driver 224

Enclosure 226

Housing 228

Section A-A

Section B-B

800

4.0 mm between conventional speaker and cameras 0.5 mm between magnetically self-shielded speaker and cameras

1000

1050

1100

1200

MAGNETICALLY SELF-SHIELDED SPEAKER BOX FOR A MOBILE DEVICE

RELATED APPLICATION(S)

This application is a national stage entry of International Application No. PCT/US2023/076861, filed Oct. 13, 2023, the disclosure of which is incorporated herein by reference in its entirety.

BACKGROUND

Generally, improvements in packaging efficiency of smartphones consists of minimizing the size of a given functional module and either reducing the overall size of the product or providing the resulting space savings to other key modules, such as a battery or a camera. A common component in smartphone designs is an earpiece speaker for providing audio output into a user's ear, for example, during a phone call. Generally, the earpiece speaker is sealed within a dedicated enclosure forming a speaker box with a specific internal "back volume" for the earpiece speaker to operate.

The overall size of the speaker box and spacing requirements between the speaker box and adjacent system components, however, is a frequent barrier to product size reduction and/or battery size increase. Such limitations are due to the speaker box requiring thick wall sections for injection-molded plastic fabrication and requiring a minimum width for liquid glue or film adhesive seals. Further, conventional speaker boxes permit magnetic flux generated by the speaker transducer to penetrate beyond the physical boundaries of the speaker box.

Another critical component of smartphones is a camera module (e.g., front-facing "selfie" camera and/or rear-facing camera), increasingly with auto-focus functionality. Auto-focus cameras generally include a voice coil motor (VCM) with one or more permanent magnets. Because of this use of magnets, VCMs are highly susceptible to magnetic coexistence problems when magnetic fields external to the VCM penetrate the camera module. Conventionally, the solution for locating both a conventional earpiece speaker and an auto-focus camera module proximate one another near the "top" of the smartphone was to keep them far enough away from each other that the transducer magnetic field failed to reach the VCM, thereby preventing further improvements in packaging efficiency for at least these two critical components.

SUMMARY

The present document describes techniques for a magnetically self-shielded speaker box for a mobile device. The speaker box described herein may include a thin metal enclosure. The speaker box may reduce or eliminate plastic components from the exterior enclosure of the speaker box. The metal of the enclosure may have a high magnetic permeability to prevent penetration of a magnetic field generated by the speaker transducer within the exterior enclosure. Also, the exterior enclosure may include at least two enclosure portions that are joined together with a continuous welded seam. Accordingly, the speaker box described herein may be a thin-walled, fully metal, high-permeability enclosure resulting in a smaller, self-shielded solution that reduces both (i) the total physical volume of the speaker box for a given internal speaker back volume and (ii) the spacing requirements to adjacent VCM auto-focus camera modules.

In aspects, a mobile device is disclosed. The mobile device includes a camera module and a microspeaker module. The camera module has a voice coil motor with one or more magnets. The voice coil motor may be configured to provide an auto-focus functionality for the camera module. The microspeaker module is located in proximity to the camera module within a range of 0.5 to 3.5 millimeters, the microspeaker module including a magnetically self-shielded speaker box and a speaker driver housed within the magnetically self-shielded speaker box.

For the purposes of the subject disclosure, "magnetically self-shielded" is understood to mean that the speaker box is adapted to not allow or at least restrict a magnetic field from penetrating an inner volume defined by the speaker box. In other words, "magnetically self-shielded" indicates that the speaker box provides or forms a barrier to magnetic field(s) entering (or exiting) the speaker box.

This summary is provided to introduce simplified concepts of a magnetically self-shielded speaker box for a mobile device, which are further described below in the Detailed Description. This summary is not intended to identify essential features of the claimed subject matter.

BRIEF DESCRIPTION OF THE DRAWINGS

The details of one or more aspects of a magnetically self-shielded speaker box for a mobile device are described in this document with reference to the following drawings. The same numbers are used throughout the drawings to reference like features and components:

FIG. 2 illustrates an example implementation of the electronic device from FIG. 1 in more detail;

DETAILED DESCRIPTION

The present document describes a magnetically self-shielded speaker box for a mobile device. Conventional smartphones have physical packaging limitations between components that are sensitive to external magnetic fields and components that generate such magnetic fields. For example, some camera modules include magnets used with a voice coil motor (VCM) to provide auto-focus functionality, but such modules are vulnerable to external magnetic fields, including magnetic fields generated by an adjacent speaker transducer. Because of this vulnerability to magnetic fields, the proximity of such camera modules to the speaker has been conventionally limited by the reach of the magnetic field generated by the speaker transducer, thereby limiting packaging efficiency and compactness of the smartphone.

The magnetically self-shielded speaker box disclosed herein may include a thin-walled speaker enclosure having a high magnetic permeability. The speaker enclosure may be metal and weld sealed. The speaker enclosure houses a transducer in a manner that includes an empty volume (e.g., "back volume") between a rear of the transducer and an interior surface of the speaker enclosure. The transducer generates a magnetic field within the back volume. The speaker enclosure, based on having a high magnetic permeability, significantly reduces (or prevents) magnetic flux of the transducer-generated magnetic field from penetrating beyond the walls of the speaker enclosure. For example, the transducer-generated magnetic field is substantially contained within the speaker enclosure and the amount of magnetic flux that exits the speaker enclosure is substantially reduced or eliminated.

Thus, computing systems and devices are provided with more efficient packaging, enabling magnetically sensitive components to be physically closer together, compared to conventional systems and enabling a reduction in spacing requirements for reducing the overall size of the product and/or providing additional space for other components such as a larger battery.

While features and concepts of the described techniques for a magnetically self-shielded speaker box for a mobile device can be implemented in any number of different environments, aspects are described in the context of the following examples.

Example Systems and Apparatuses

Figure 1:
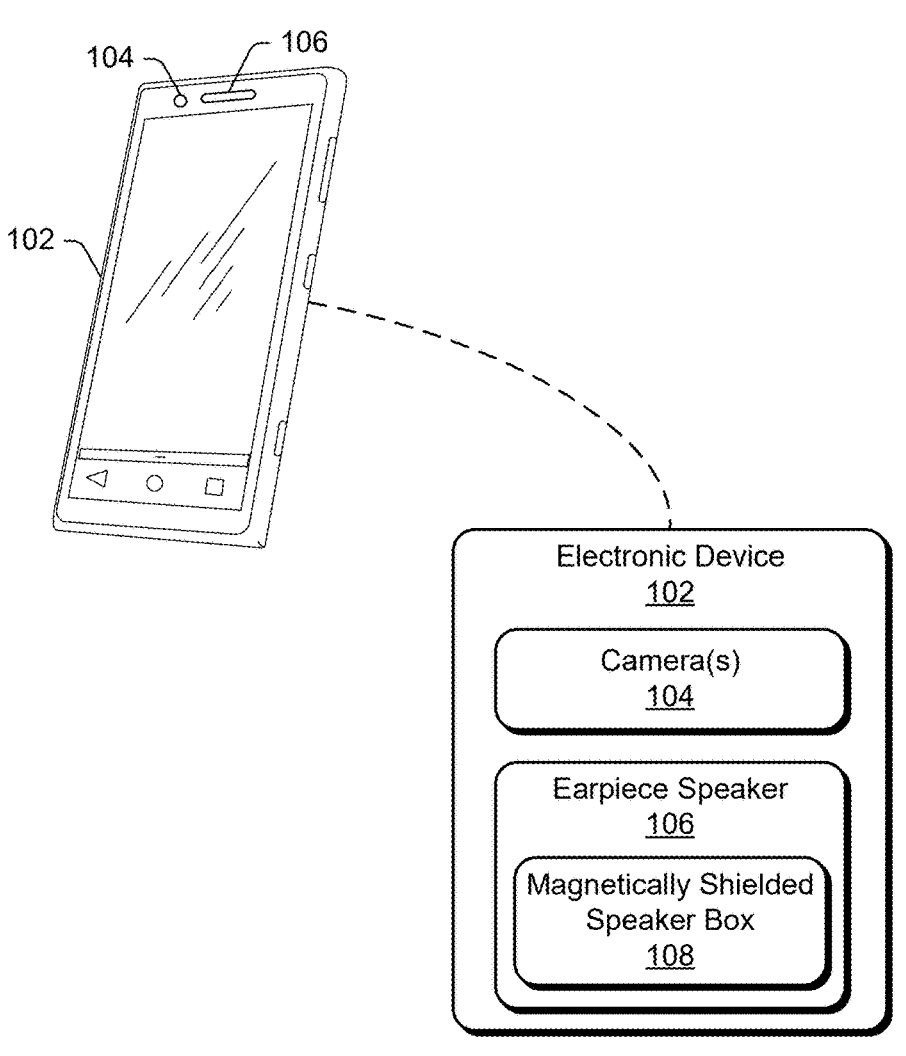
FIG. 1 illustrates an example implementation of an electronic device in which aspects of a magnetically self-shielded speaker box can be implemented.

FIG. 1 illustrates an example implementation 100 of an electronic device 102 in which aspects of a magnetically self-shielded speaker box can be implemented. The electronic device 102 (e.g., a mobile device) includes one or more cameras 104 and an earpiece speaker 106. The earpiece speaker 106 includes a magnetically shielded speaker box 108, which provides a barrier to magnetic fields so the camera(s) 104 can be located in close proximity to the earpiece speaker. As described herein, the proximity of magnetically sensitive components, such as front- and rear-facing cameras in a mobile device, to conventional earpiece speakers is limited by the speaker's magnetic field. Using a magnetically shielded speaker box 108 (e.g., a speaker box with a high magnetic permeability), however, enables the camera(s) 104 and the earpiece speaker 106 to be closer together when compared to conventional systems. Such proximity enhances spatial efficiency within the electronic device 102.

FIG. 2 illustrates an example implementation 200 of the electronic device from FIG. 1 in more detail. The electronic device 102 is illustrated with a variety of example devices, including a smartphone 102-1, a tablet 102-2, a laptop 102-3, a security camera 102-4, a computing watch 102-5, computing spectacles 102-6, a digital camera 102-7, and a video-recording doorbell 102-8. The electronic device 102 can also include other devices, such as televisions, entertainment systems, desktop computers, audio systems, projectors, automobiles, drones, track pads, drawing pads, netbooks, e-readers, home security systems, camera systems, thermostats, and other home appliances. Note that the electronic device 102 can be mobile, wearable, non-wearable but mobile, or relatively immobile (e.g., desktops and appliances).

The electronic device 102 includes a battery pack (e.g., battery 202). The battery 202 may be any suitable battery, rechargeable or non-rechargeable. As described herein, the battery 202 may be a Li-ion battery.

The electronic device 102 includes one or more processors 204 (e.g., any of microprocessors, microcontrollers, or other controllers) that can process various computer-executable instructions to control operation of the electronic device 102 and to enable techniques for a magnetically self-shielded speaker box for a mobile device. The processors 204 are described in further detail below.

The electronic device 102 also includes computer-readable media 206 (CRM 206) that provides storage for various applications 208 and system data. Applications 208 and/or an operating system 210 implemented as computer-readable instructions on the computer-readable media 206 (e.g., the storage media) can be executed by the processor(s) 204 to provide some or all of the functionalities described herein. The computer-readable media 206 provides data storage mechanisms to store various device applications 208, the operating system 210, memory/storage, and other types of information and/or data related to operational aspects of the electronic device 102. For example, the operating system 210 can be maintained as a computer application within the computer-readable media 206 and executed by the processor(s) 204 to provide some or all of the functionalities described herein. The device applications 208 may include a device manager, such as any form of a control application, a software application, or signal-processing and control modules. The electronic device 102 may also include, or have access to, one or more machine learning systems.

Various implementations of the application(s) 208 can include, or communicate with, a system-on-chip (SoC), one or more integrated circuits (ICs), a processor having embedded processor instructions or configured to access processor instructions stored in memory, hardware with embedded firmware, a printed circuit board (PCB) with various hardware components, or any combination thereof. The PCB may be formed, for example, from glass-reinforced epoxy material such as FR4 (flame retardant woven glass-reinforced epoxy resin). In some instances, the PCB may include a single layer of electrically conductive traces and be a single-layer board. In other instances, the PCB may be a multi-layer board that includes multiple layers of electrically conductive traces that are separated by layers of a dielectric material.

The electronic device 102 may also include a network interface 212. The electronic device 102 can use the network interface 212 for communicating data over wired, wireless, optical, or audio (e.g., acoustic) networks. By way of example and not limitation, the network interface 212 may communicate data over a local-area network (LAN), a wireless local-area network (WLAN), a home-area network (HAN), a personal-area network (PAN), a wide-area network (WAN), an intranet, the Internet, a peer-to-peer network, point-to-point network, or a mesh network. The network interface 212 can be implemented as one or more of a serial and/or parallel interface, a wireless interface, any type of network interface, a modem, or any other type of communication interface. Using the network interface 212, the electronic device 102 may communicate via a cloud computing service to access a platform having resources.

The electronic device 102 also includes a camera system 214. The camera system 214 is configured to capture images, video, and/or audio. Any suitable camera system 214 may be implemented in or communicatively coupled to the electronic device 102. The camera system 214 may be a digital camera that converts light captured by a lens to digital data representing a scene within a field of view (FOV) of the lens. In implementations, the camera system 214 includes one or more image sensors 216. In addition, the camera system 214 may include an auto-focus mechanism 218 that provides automatic focusing for the camera system 214. In some implementations, the auto-focus mechanism 218 includes a voice coil motor (VCM), which uses a magnetic field to move a coil in different directions (e.g., back and forth). The VCM is used to adjust the position of one or more lens elements of the camera system 214 to adjust the focus of the camera lens.

The electronic device 102 can also include a display 220 (e.g., display device 220). The display 220 can include any suitable touch-sensitive display device, such as a touch-screen, a liquid crystal display (LCD), a thin-film transistor (TFT) LCD, an in-place switching (IPS) LCD, a capacitive touchscreen display, an organic light-emitting diode (OLED) display, an active-matrix organic light-emitting diode (AMOLED) display, a super AMOLED display, and so forth. The display 220 may be referred to as a display or a screen, such that digital content may be displayed on-screen.

The electronic device 102 can also include a microspeaker module 222. Generally, the microspeaker module 222 can be referred to as an earpiece speaker and is operable to output audio signals, such as into a user's ear during a phone call. The microspeaker module 222 includes at least a speaker driver 224 and an enclosure 226. The speaker driver 224 is a transducer and may include at least a magnetic circuit and a vibration system, which are used to generate sound. The speaker driver 224 is assembled within the enclosure 226. The enclosure 226 provides a sealed space as a "back volume" for the speaker driver. The enclosure 226, as described herein, is a magnetically self-shielded speaker box. The speaker driver 224 provides a backward sound wave into the "back volume" provided between a rear side of the speaker driver 224 and an interior surface of the enclosure 226. The backward sound wave is isolated by the enclosure 226 to avoid weakening a frontward sound wave provided by the speaker driver 224. The speaker driver 224 can be any suitable size driver. However, in smartphones, the speaker driver 224 is relatively small in physical size and hence, can be considered to be part of a "microspeaker module" (e.g., the microspeaker module 222). In one example implementation, the speaker driver 224 is a 10 millimeters (mm) by 12 mm transducer.

Additionally, as described in more detail herein, the enclosure 226 has high permeability to reduce or prevent magnetic flux from penetrating beyond the walls of the enclosure 226, such as penetrating through the walls from the interior of the enclosure 226 to the exterior of the enclosure 226, or vice versa. A high magnetic permeability indicates that the material easily aligns itself to a magnetic field. In one example, the enclosure 226 has a magnetic permeability of greater than 500 Henry per meter (H/m). In another example, the enclosure 226 is made of 430 stainless steel, which has a magnetic permeability of 600-1100 H/m. As described herein, a high magnetic permeability is defined by a magnetic permeability equal to or greater than 500 H/m. A low magnetic permeability may be defined as being less than 100 H/m.

The electronic device 102 also includes a housing 228. The housing 228 houses the various components of the electronic device 102, including, for example, the camera system 214 and the microspeaker module 222. In some aspects, the housing 228 includes at least two portions that are coupled together. The at least two portions of the housing 228 can be joined together (e.g., welded, soldered, brazed, fused) to prevent dust and/or water ingress into circuitry and other components located within the housing 228.

These and other capabilities and configurations, as well as ways in which entities of FIGS. 1 and 2 act and interact, are set forth in greater detail below. These entities may be further divided, combined, and so on. The implementation 100 of FIG. 1, and the detailed illustrations of FIG. 2 through FIG. 13, illustrate some of many possible environments, devices, and methods capable of employing the described techniques, whether individually or in combination with one another.

Figure 3:
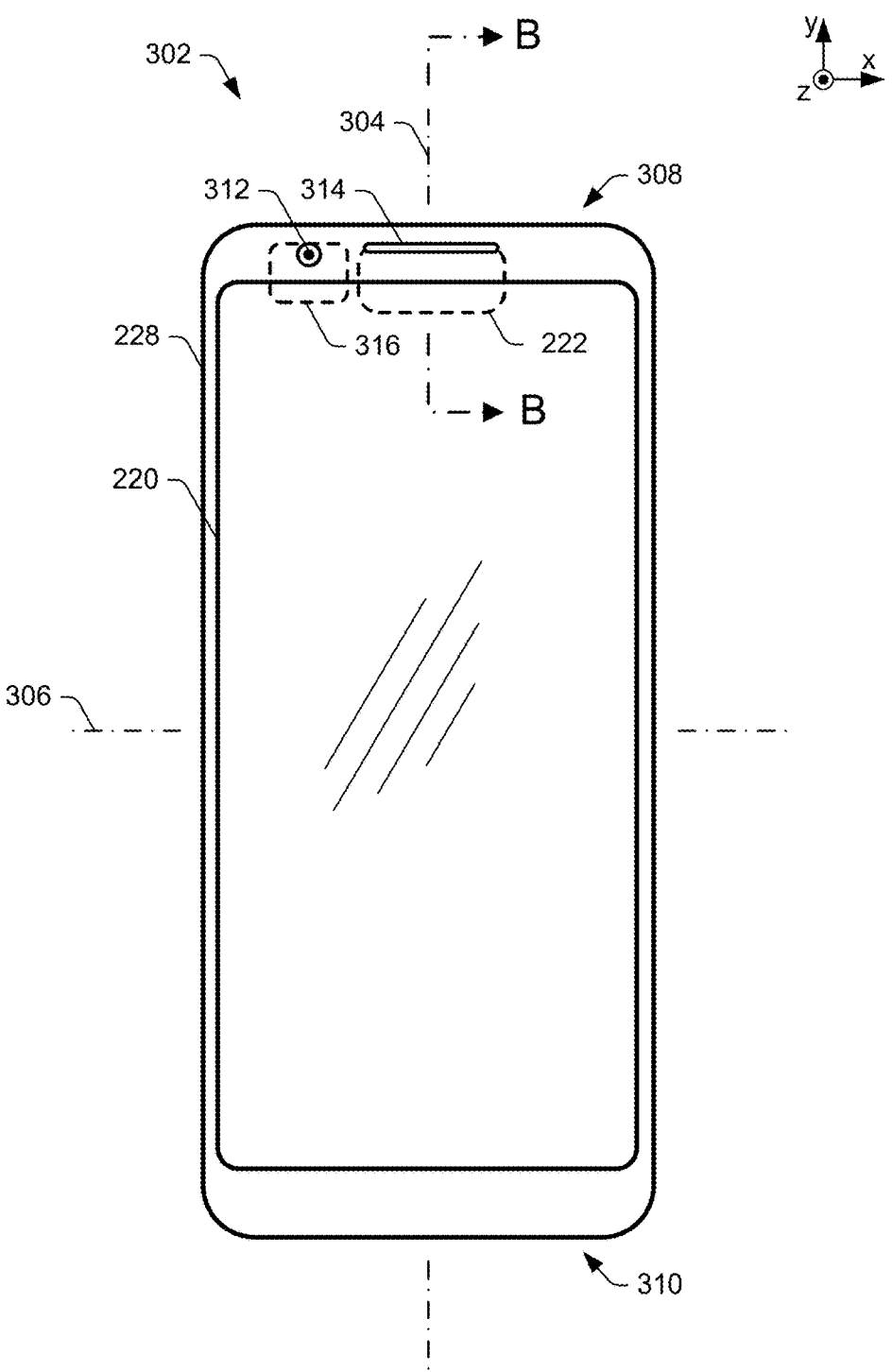
FIG. 3 illustrates a front view of an example mobile device, which is an example of the electronic device in FIG. 2 and is configured for a magnetically self-shielded speaker box.

FIG. 3 illustrates a front view 300 of an example mobile device 302, which is an example of the electronic device 102 in FIG. 2 (e.g., the smartphone 102-1) and includes a magnetically self-shielded speaker box. The example mobile device 302 is illustrated and described according to a cartesian coordinate system. Thus, some dimensions of the smartphone may be described relative to a corresponding axis. For example, the smartphone includes length, width, and depth. The length corresponds to a y-dimension, which is parallel to a y-axis (e.g., first axis 304). The width corresponds to an x-dimension, which is parallel to an x-axis (e.g., second axis 306). The depth corresponds to a z-dimension, which is parallel to a z-axis (e.g., third axis (not shown)). The length is greater than the width (e.g., by a factor of at least 1.5). The z-axis intersects front and rear sides of the smartphone and is normal (orthogonal) to the exterior surface of the display 220. In many smartphones, the depth is significantly less than the width (e.g., by a factor of at least 5).

Generally, smartphones are designed for primary use in a portrait orientation with a "top" of the device having an earpiece speaker for use during phone calls. For purposes of discussion herein, the mobile device 302 is described with a first end 308 and an opposing, second end 310 that each intersect the first axis 304, where the first end 308 is referred to as the "top" of the mobile device 302 and the second end 310 is referred to as the "bottom" of the mobile device 302. However, it should be readily understood that the terms top and bottom can be relative to the device's orientation in space and the implementations described herein are not limited to the first end 308 being the top and the second end 310 being the bottom.

The illustrated example is a view of a front side of the mobile device 302, showing the display 220 (e.g., touch-screen), the housing 228, a front-facing camera 312, and a speaker port 314. Some components located within the housing 228 (e.g., internal to the mobile device 302) are illustrated with dashed lines, including the microspeaker module 222 and a front-facing camera module 316 of the front-facing camera 312. Additional features, such as sensors, modules, ports, buttons (e.g., power button, volume button(s)), etc., can also be included on the mobile device 302 but are not shown in this illustration for the sake of simplicity. The speaker port 314 and the front-facing camera 312 are generally located proximate to the top of the mobile device 302 to enable (i) the user to place the speaker port near the user's ear during a phone call and (ii) to capture a "selfie" image without obstructing the front-facing camera 312 with the user's hand, finger, or thumb.

Figure 4:
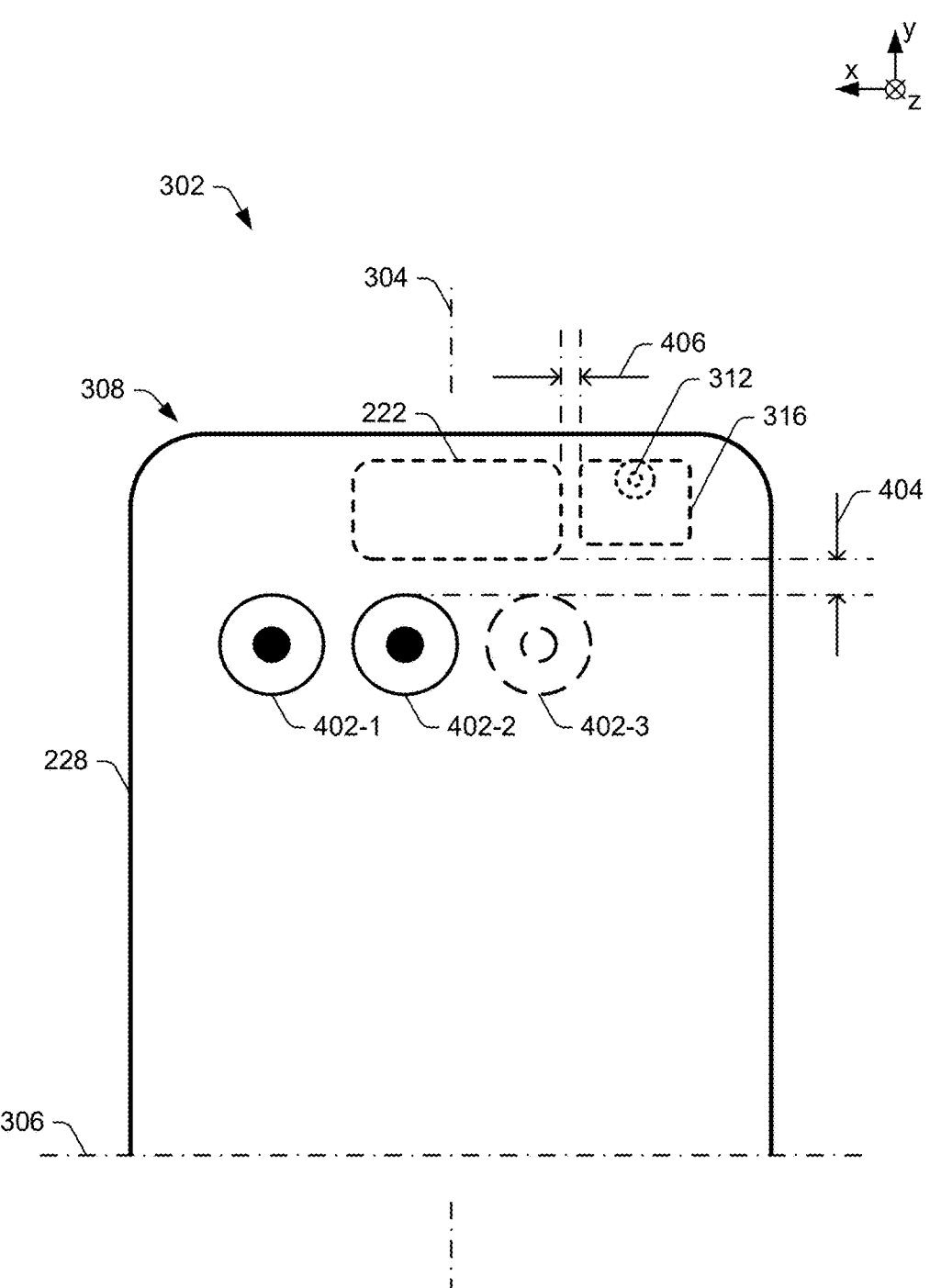
FIG. 4 illustrates a rear view of a portion of the example mobile device in FIG. 3 with an example configuration of multiple rear-facing cameras.

FIG. 4 illustrates a rear view 400 of a portion of the example mobile device 302 in FIG. 3 with an example configuration of rear-facing cameras 402. The illustrated example is a view of a rear side of a portion of the mobile device 302, showing the housing 228 and multiple rear-facing cameras 402. Additionally, some components not visible via the rear side of the mobile device 302 are shown in dashed lines, including the microspeaker module 222 and the front-facing camera 312, which is exposed via the front side of the mobile device 302. In the illustrated example, the mobile device 302 includes a first camera 402-1 and a second camera 402-2 on the rear side of the mobile device 302. Any suitable number of rear-facing cameras 402 can be implemented on the mobile device 302. In one example, the mobile device 302 includes a third camera 402-3. The rear-facing cameras 402 can include any configuration or combination of lenses, including one or more of a wide-angle lens, an ultrawide lens, a telephoto lens, a macro lens, and/or a periscope lens. The example configuration of the rear-facing cameras 402 includes the first, second, and third cameras 402-1, 402-2, and 402-3, respectively, positioned in a horizontal row that is substantially parallel with the x-axis (e.g., the second axis 306) of the mobile device 302. Any suitable configuration of rear-facing cameras 402 can be implemented and the implementations described herein are not to be limited to the specific examples shown.

Generally, the rear-facing cameras 402, the front-facing camera 312, and the earpiece speaker (e.g., microspeaker module 222) are located as close to the top edge of the mobile device 302 as possible. The proximity of such components is conventionally limited to approximately 10 mm due to the amount of magnetic flux generated by the earpiece speaker, which causes interference with the cameras, specifically with the auto-focus functionality of the cameras. Accordingly, a first distance 404 represents a proximity between one of the rear-facing cameras 402 and the microspeaker module 222. A second distance 406 represents a proximity between the front-facing camera 312 and the microspeaker module 222. For spatial efficiency and packaging, the first distance 404 and the second distance 406 may be minimized, subject to the magnetic field generated by the microspeaker module 222.

Conventionally, the magnetic flux of the microspeaker module 222 has limited the first and second distances 404 and 406 to a minimum of approximately 4.0 mm. However, by implementing the magnetically self-shielded speaker box described herein, the first and second distances 404 and 406 can be reduced to less than 1.0 mm, including 0.5 mm. By reducing the first distance 404, the rear-facing cameras 402 can be positioned closer to the top edge (e.g., first end 308) of the mobile device 302, which may improve the user experience when using one or more of the rear-facing cameras 402. By reducing the second distance 406, the front-facing camera 312 can be positioned closer to the y-axis (e.g., the first axis 304) of the mobile device 302, which may improve usability and the user experience when using the front-facing camera 312.

Figure 5:
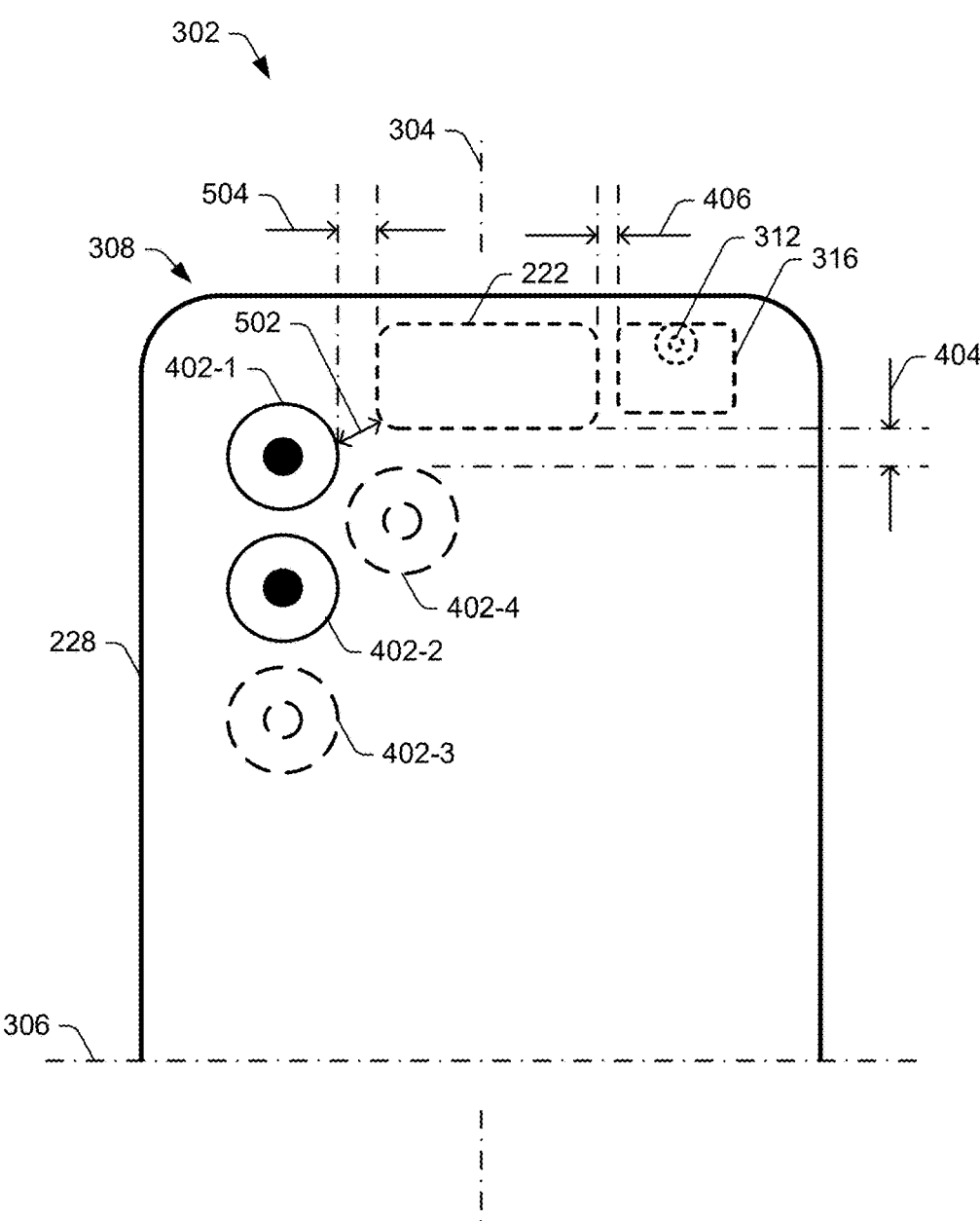
FIG. 5 illustrates a rear view of a portion of the example mobile device in FIG. 3 with an alternative example configuration of rear-facing cameras.

FIG. 5 illustrates a rear view 500 of a portion of the example mobile device 302 in FIG. 3 with an alternative example configuration of rear-facing cameras 402. In one example, the multiple rear-facing cameras 402 (e.g., the first, second, and third cameras 402-1, 402-2, and 402-3, respectively) are arranged in a column that is substantially parallel to the y-axis (e.g., the first axis 304). In another example, the rear-facing cameras 402 (e.g., the first, second, and third cameras 402-1, 402-2, and 402-4, respectively) are arranged in a triangular configuration. Accordingly, any suitable configuration of rear-facing cameras can be implemented on the mobile device 302.

Depending on the configuration of the rear-facing cameras 402, the first distance 404 may or may not be necessary. For example, in the above-described column arrangement, the first distance does not exist. However, the proximity of the first camera 402-1 to the microspeaker module 222 may be defined by a third distance 502 or a fourth distance 504.

In some implementations, two or more of the first, second, third, and fourth distances 404, 406, 502, and 504, respectively, may equal one another. For example, the third distance 502 may equal the fourth distance 504 and/or the first distance 404 from FIG. 4. In some cases, the second distance 406 is equal to the first, third, and fourth distances 404, 502, and 504, respectively. Alternatively, all of the first, second, third, and fourth distances 404, 406, 502, and 504, respectively, may be different from one another.

Figure 6:
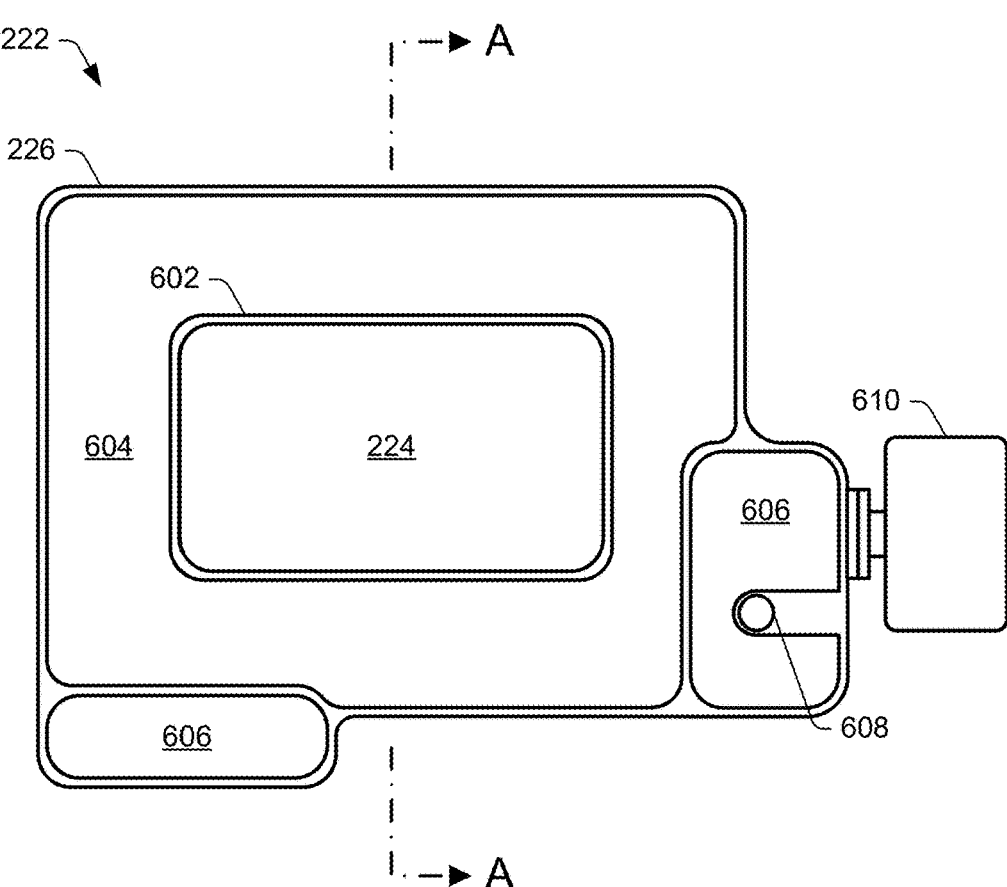
FIG. 6 illustrates an example implementation of a microspeaker module in FIG. 2.

FIG. 6 illustrates an example implementation 600 of the microspeaker module 222 in FIG. 2. The illustrated example shows a front side of the microspeaker module 222. The microspeaker module 222 includes the speaker driver 224 and the enclosure 226. The speaker driver 224 is aligned with an opening 602 in a wall of the enclosure 226, such that a front side of the speaker driver 224 is exposed via the opening 602 in the enclosure 226. The opening 602 enables passage of frontward sound waves output by the speaker driver 224. Additionally, the microspeaker module 222 may include a pressure-sensitive adhesive (PSA) audio seal 604 coupled to a front exterior surface of the enclosure 226. Also, conductive PSA 606 may be coupled to the front exterior surface of the enclosure 226 for grounding. In some implementations, the microspeaker module 222 also includes a barometric vent 608 for equalizing barometric pressure between the exterior and interior of the enclosure 226. Further, the microspeaker module 222 can include circuitry 610 for electrically connecting the speaker driver 224 to a power source and a controller (e.g., the processor 204). In aspects, the enclosure 226 is a metal enclosure having a high magnetic permeability to reduce (or prevent) magnetic flux from penetrating beyond the bounds of the walls of enclosure, either from the interior to the exterior of the enclosure 226 or from the exterior to the interior of the enclosure 226.

Figure 7:
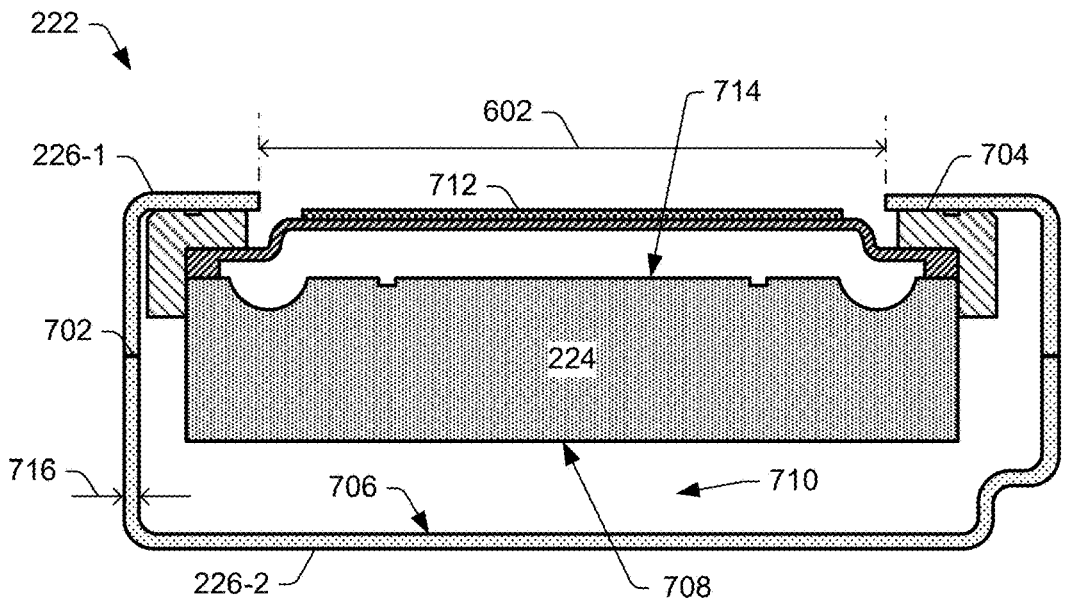
FIG. 7 illustrates a sectional view of the microspeaker module, taken from line A-A in FIG. 6.

FIG. 7 illustrates a sectional view 700 of the microspeaker module 222, taken from line A-A in FIG. 6. The speaker driver 224 is housed within the enclosure 226, which may be formed from one or more enclosure members, such as a front-enclosure member 226-1 and a rear-enclosure member 226-2. In implementations, the front- and rear-enclosure members 226-1 and 226-2, respectively, are joined (bonded) together via a continuous welded seam 702. Within the enclosure 226 there may be included an internal bracket 704, which may be a rigid, non-conductive material, such as plastic. The internal bracket 704 may be a driver holder to secure the speaker driver 224 in position relative to the enclosure 226. Between an interior surface 706 of the rear-enclosure member 226-2 and a rear side 708 of the speaker driver 224 (opposite the opening 602 in the front-enclosure member 226-1) is a sealed space used as a back volume 710 for operation of the microspeaker module 222. The speaker driver 224 can also include a membrane 712 coupled to a front side 714 of the speaker driver 224 and used in operation of the speaker driver 224 in relation to generation of the frontward sound wave.

By using a metal material for the enclosure, the first and/or second enclosure members 226-1 and 226-2, respectively, can have a wall thickness 716 within a range of approximately 0.3 mm to approximately 0.01 mm, including 0.15 mm. Compared with conventional plastic enclosures that have a wall thickness of 0.5 mm, the metal enclosure described herein enables a significant reduction in size of the overall part and therefore an enhancement to the compactness of the mobile device.

Figure 8:
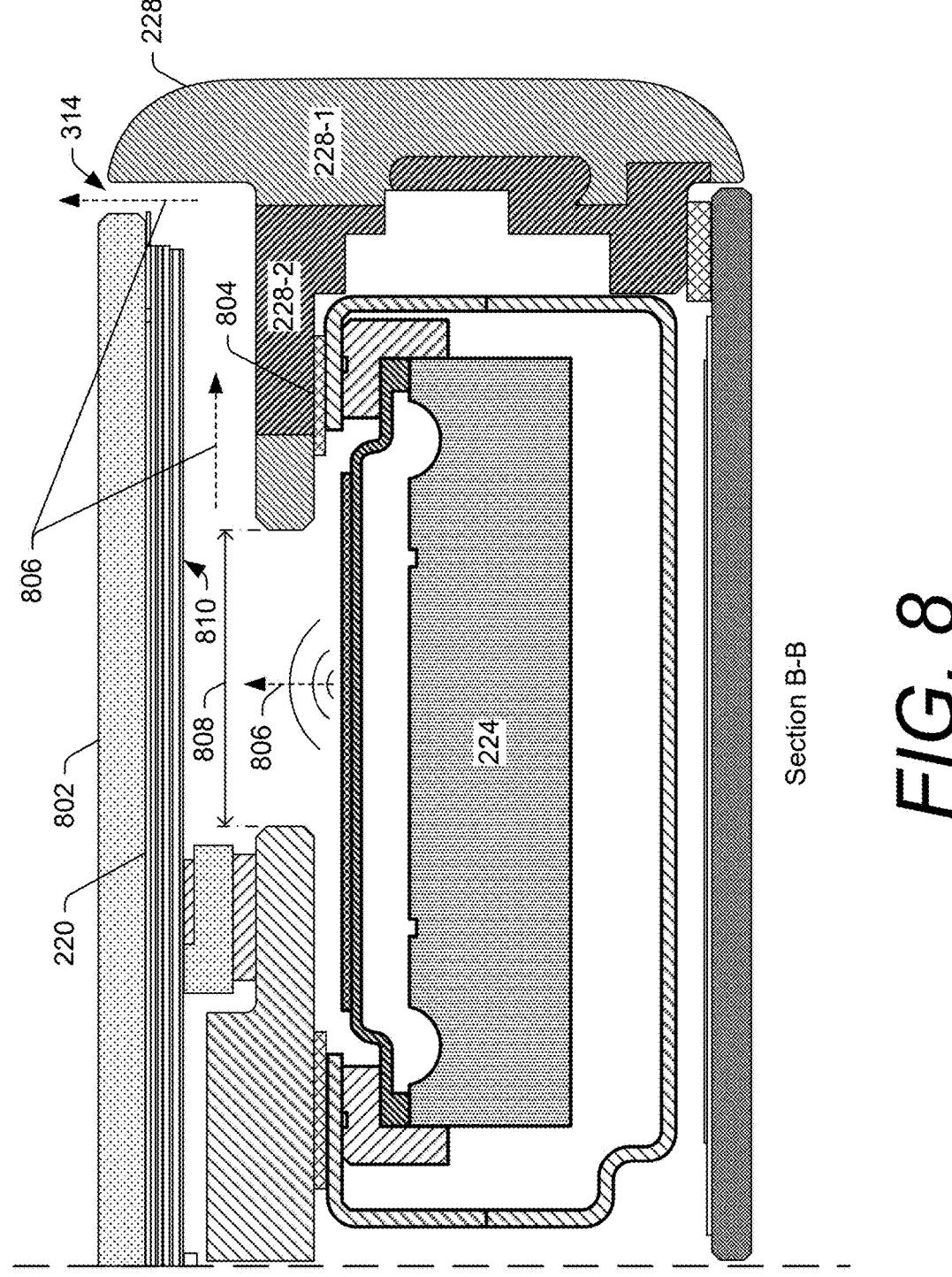
FIG. 8 illustrates sectional view of a portion of the mobile device, taken along line B-B in FIG. 3.

FIG. 8 illustrates sectional view 800 of a portion of the mobile device 302, taken from FIG. 3 along line B-B. The mobile device 302 includes a cover glass 802 stacked over the display 220. The housing 228 can include an external metal portion 228-1 for rigidity and reliability and an internal plastic portion 228-2 to reduce manufacturing costs and provide a non-conductive support for internal components such as the microspeaker module 222.

In aspects, a hole (e.g., opening 602 in FIG. 6) is stamped, cut, or formed in the front-enclosure member 226-1. The front-enclosure member 226-1 can be adhered to the housing 228 of the mobile device 302. For example, the front-enclosure member 226-1 can be coupled to the internal plastic portion 228-2 via PSA 804 or other adhesive material. Audio signals 806 (indicated by dashed arrows) generated by the speaker driver 224 pass through the opening 602 in the front-enclosure member 226-1 of the microspeaker module 222 (shown in FIG. 7), through an aperture 808 (e.g., hole) in the internal plastic portion 228-2 of the housing 228, and through a channel between the internal plastic portion 228-2 of the housing 228 and a back side 810 of the display 220. Then, the audio signals 806 exit through a narrow slot (speaker port 314) between the housing 228 and the cover glass 802.

Figure 9:
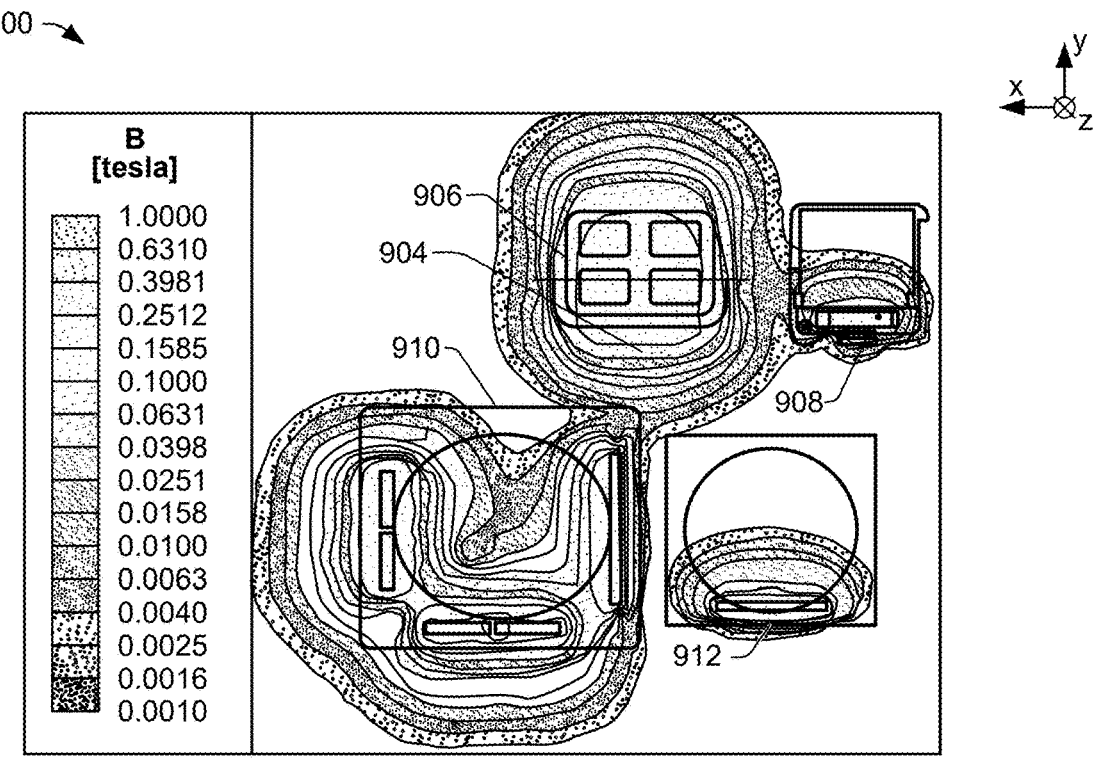
FIG. 9 illustrates example diagrams representing magnetic flux measurements of a conventional speaker box proximate to mobile-device cameras compared to a magnetically self-shielded speaker box proximate to mobile-device cameras.
Figure 9:
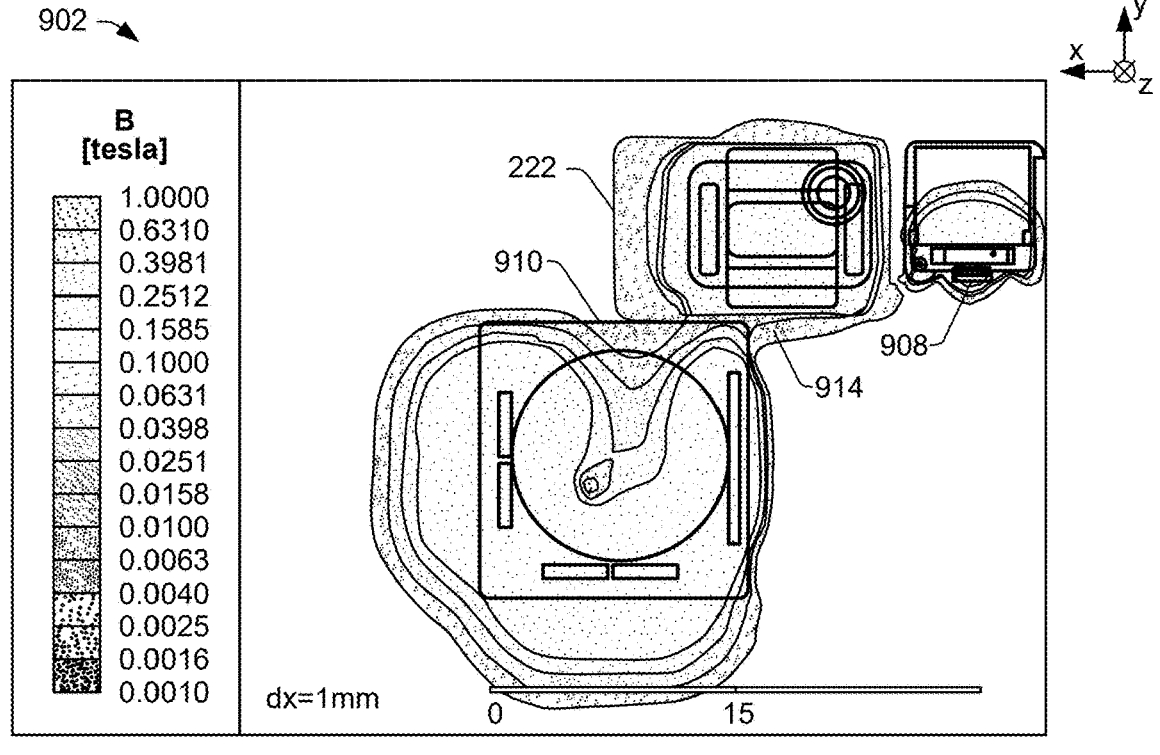

FIG. 9 illustrates first and second diagrams 900 and 902 representing magnetic flux measurements of a conventional speaker box proximate to mobile-device cameras compared to a magnetically self-shielded speaker box proximate to mobile-device cameras. The first diagram 900 shows magnetic flux 904 from a conventional microspeaker 906 proximate to a front-facing camera 908 and two rear-facing cameras 910 and 912. Because each of the cameras 908, 910, and 912 have VCMs for auto-focus, they are susceptible to external magnetic fields. The front-facing camera 908 and the rear-facing camera 912 are both single-magnet VCMs and the rear-facing camera 910 is a 3-magnet VCM. Notice the magnetic flux 904 of the conventional microspeaker 906 penetrating far beyond the walls of the microspeaker 906 itself, preventing the cameras 908, 910, and 912 from being located any closer than approximately 4.0 mm.

The second diagram 902 shows magnetic flux 914 from a magnetically self-shielded microspeaker (e.g., microspeaker module 222). Notice in this example a small amount of the magnetic flux 914 that penetrates through the microspeaker module 222, which is significantly reduced in comparison to the conventional microspeaker 906 in the first diagram 900. In some implementations, depending on the magnetic permeability of the enclosure 226, the magnetic flux 914 that penetrates beyond the walls of the enclosure 226 can be reduced to a negligible amount or even eliminated. For example, the magnetic flux 914 measured at 0.5 mm from the side of the microspeaker module 222 closest to the camera 910 is between 0.0026 and 0.0040 Tesla. As such, the magnetic flux 914 generated by the microspeaker module 222 is reduced sufficient to enable the microspeaker module 222 to be located in proximity to the camera module within a range of 0.5 to 3.5 millimeters from the cameras 908 and 910. Accordingly, the magnetically self-shielded speaker box described herein enhances spatial efficiency between the speaker box and the cameras, thereby providing additional space for other components (e.g., a larger battery) or reducing an overall size of the mobile device 302.

Figure 10A:
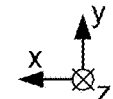
FIG. 10A illustrates another example diagram of magnetic flux measurements relative to a microspeaker module, a front-facing camera, and a main rear-facing camera.
Figure 10A:
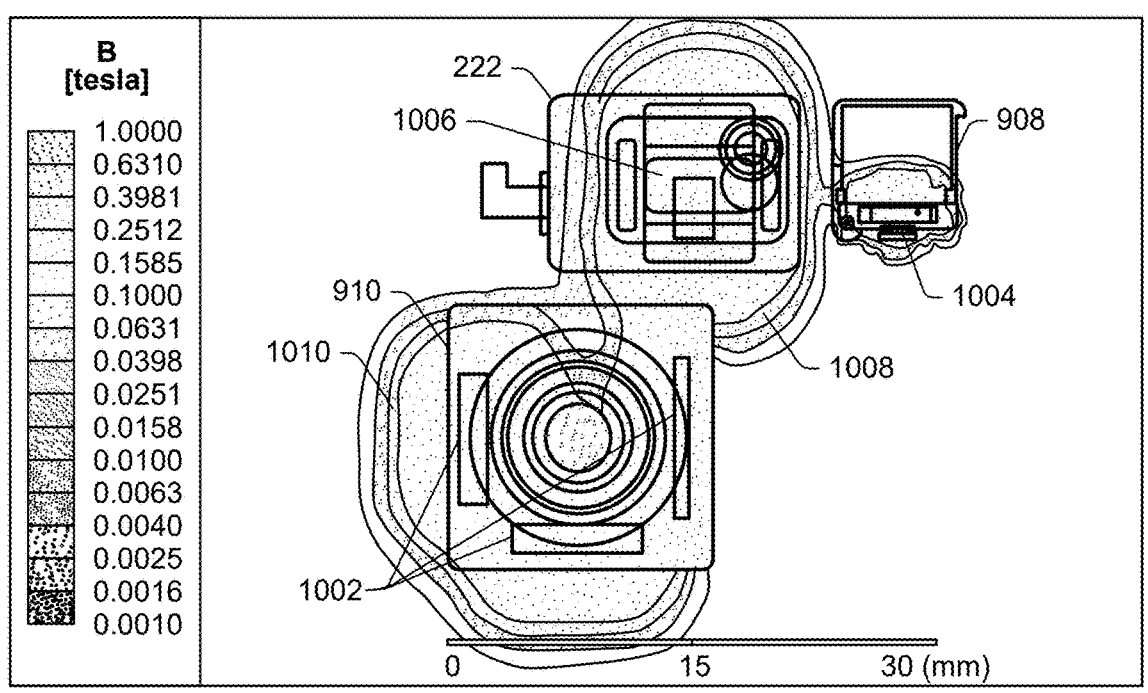
Figure 10B:
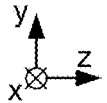
FIG. 10B illustrates a side view of the example diagram from FIG. 10A.
Figure 10B:
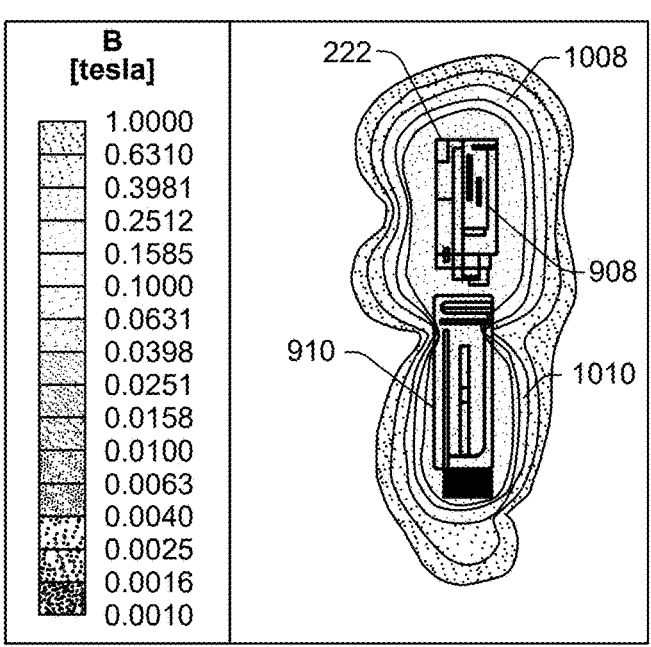

FIG. 10A illustrates another example diagram 1000 of magnetic flux measurements relative to the microspeaker module 222, the front-facing camera 908, and a main rear-facing camera 910 (e.g., the first camera 402-1). FIG. 10B illustrates a side view 1050 of the example diagram 1000 from FIG. 10A. The main rear-facing camera 910 includes a 3-magnet VCM (e.g., magnets 1002). The front-facing camera 908 includes a single-magnet VCM (e.g., magnet 1004). Generally, the locations of the camera magnets and a speaker magnet 1006 of the self-shielded speaker box (e.g., microspeaker module 222) manage the magnetic flux magnitudes and shapes such that the magnetic flux magnitudes and shapes do not mix with each other. For example, magnetic flux 1008 from the speaker magnet 1006 of the microspeaker module 222 does not mix with magnetic flux 1010 from the main rear-facing camera 910.

Example Environments and Devices

Figure 11:
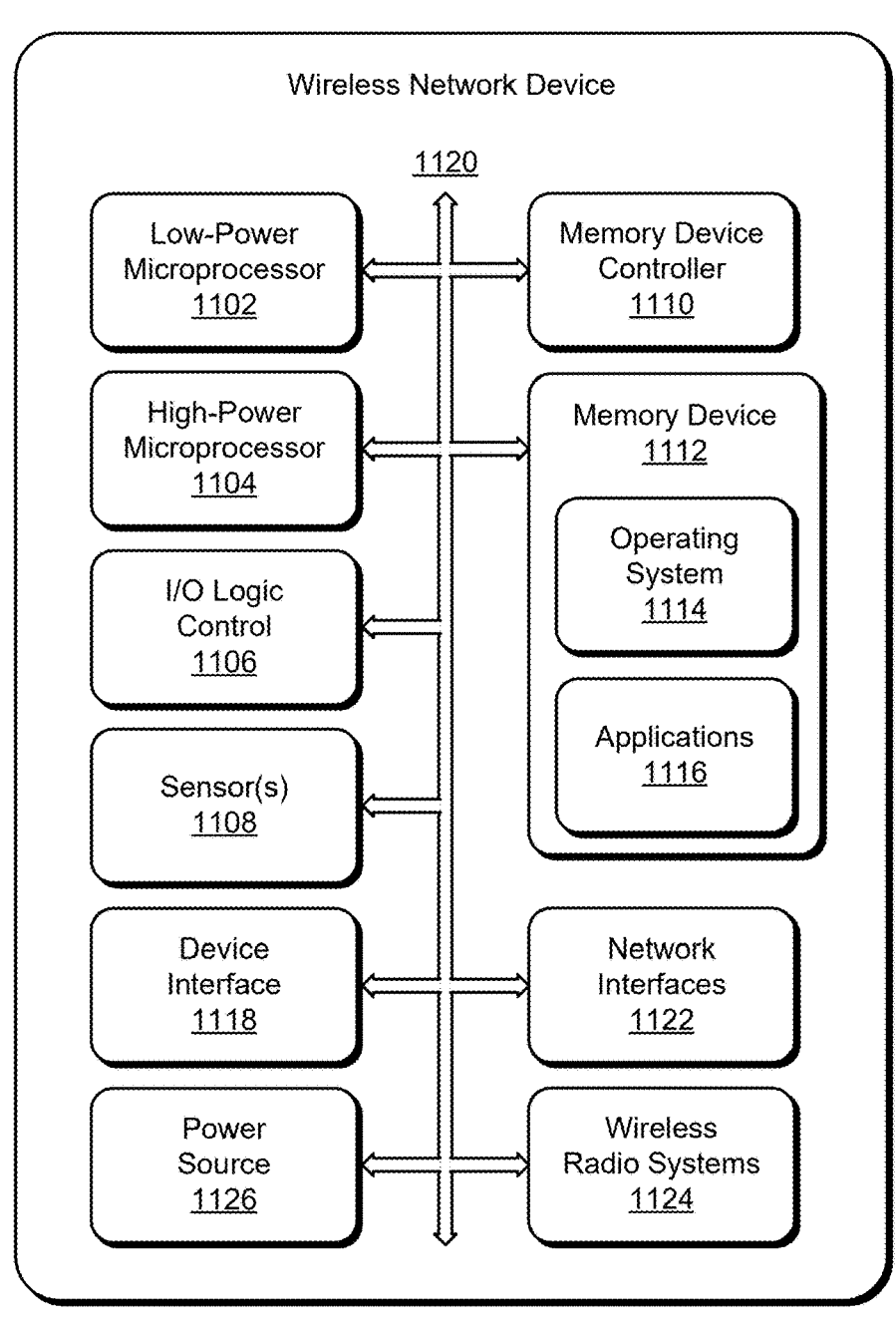
FIG. 11 illustrates an example wireless network device that can be implemented as any of the wireless network devices in a home area network in accordance with one or more aspects of a magnetically self-shielded speaker box as described herein.

FIG. 11 illustrates an example wireless network device 1100 that can be implemented as any wireless network device (e.g., electronic device 102, the mobile device 302, or other target device) in accordance with one or more aspects of a magnetically self-shielded speaker box for a mobile device as described herein. The device 1100 can be integrated with electronic circuitry, microprocessors, memory, input/output (I/O) logic control, communication interfaces and components, as well as other hardware, firmware, and/or software to implement the device. Further, the wireless network device 1100 can be implemented with various components, such as with any number and combination of different components as further described with reference to the example device 1100 shown in FIG. 11.

In this example, the wireless network device 1100 includes a low-power microprocessor 1102 and a high-power microprocessor 1104 (e.g., microcontrollers or digital signal processors) that process executable instructions. The device 1100 also includes an input-output (I/O) logic control 1106 (e.g., to include electronic circuitry). The microprocessors 1102 and 1104 can include components of an IC, a programmable logic device, a logic device formed using one or more semiconductors, and other implementations in silicon and/or hardware, such as a processor and memory system implemented as an SoC. Alternatively or in addition, the device can be implemented with any one or combination of software, hardware, firmware, or fixed logic circuitry that may be implemented with processing and control circuits. The low-power microprocessor 1102 and the high-power microprocessor 1104 can also support one or more different device functionalities of the device. For example, the high-power microprocessor 1104 may execute computationally intensive operations, whereas the low-power microprocessor 1102 may manage less complex processes such as detecting a hazard or temperature from one or more sensors 1108. The low-power microprocessor 1102 may also wake or initialize the high-power microprocessor 1104 for computationally intensive processes.

The one or more sensors 1108 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 1108 may include any one or a combination of temperature sensors, humidity sensors, hazard-related sensors, other environmental sensors, accelerometers, microphones, optical sensors up to and including cameras (e.g., charged coupled-device or video cameras), active or passive radiation sensors, GPS receivers, and RF identification detectors. In implementations, the wireless network device 1100 may include one or more primary sensors, as well as one or more secondary sensors, such as primary sensors that sense data central to a core operation of the device (e.g., sensing a temperature in a thermostat or sensing smoke in a smoke detector) and secondary sensors that may sense other types of data (e.g., motion, light or sound), which can be used for energy-efficiency objectives or automation objectives.

The wireless network device 1100 includes a memory device controller 1110 and a memory device 1112, such as any type of a nonvolatile memory and/or another suitable electronic data storage device. The wireless network device 1100 can also include various firmware and/or software, such as an operating system 1114 that is maintained as computer-executable instructions by the memory device 1112 and executed by a microprocessor. The device software may also include one or more applications 1116 (e.g., applications 208) that implement various functionalities of the wireless network device 1100. The wireless network device 1100 also includes a device interface 1118 to interface with another device or peripheral component and includes an integrated data bus 1120 that couples the various components of the wireless network device 1100 for data communication between the components. The data bus 1120 in the wireless network device 1100 may also be implemented as any one or a combination of different bus structures and/or bus architectures.

The device interface 1118 may receive input from a user and/or provide information to the user (e.g., as a user interface), and a received input can be used to determine a setting. The device interface 1118 may also include mechanical or virtual components that respond to a user input. For example, the user can mechanically move a sliding or rotatable component, or a motion along a touchpad may be detected, and such motions may correspond to a setting adjustment of the device 1100. Physical and virtual movable user-interface components can allow the user to set a setting along a portion of an apparent continuum. The device interface 1118 may also receive inputs from any number of peripherals, such as buttons, a keypad, a switch, a microphone, and an imager (e.g., a camera device).

The wireless network device 1100 can include network interfaces 1122 (e.g., network interface 212) and an external network interface for network communication, such as via the Internet. The wireless network device 1100 also includes wireless radio systems 1124 for wireless communication with other wireless network devices and for multiple, different wireless communications systems. The wireless radio systems 1124 may include Wi-Fi, Bluetooth™, Mobile Broadband, Bluetooth Low Energy (BLE), and/or point-to-point IEEE 802.15.4. Each of the different radio systems can include a radio device, antenna, and chipset that is implemented for a particular wireless communications technology. The wireless network device 1100 also includes a power source 1126, such as a battery (e.g., battery 202) and/or a cable to connect the device 1100 to line voltage. An alternating current (AC) power source may also be used to charge the battery of the device.

Figure 12:
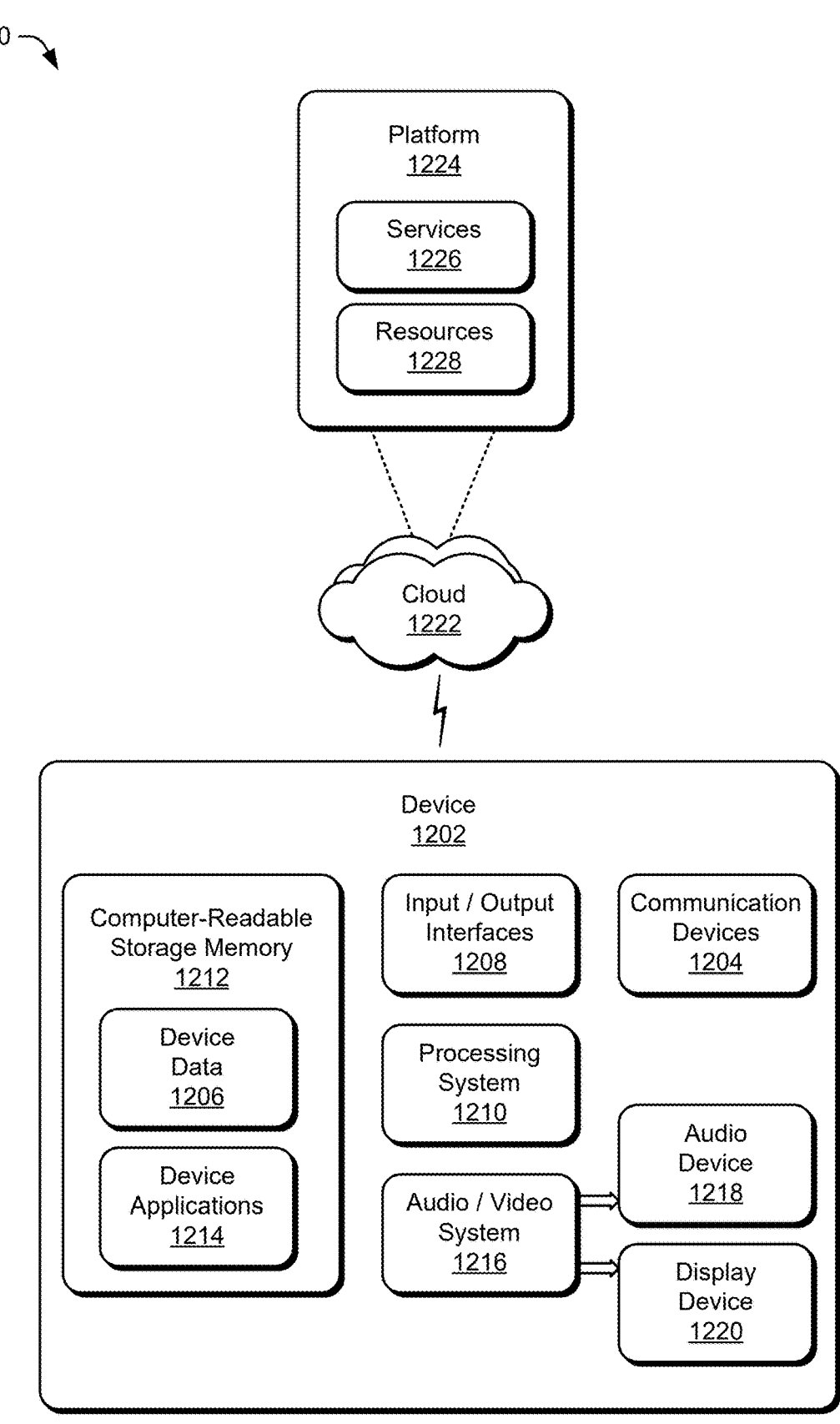
FIG. 12 illustrates an example system that includes an example device, which can be implemented as any of the wireless network devices that implement aspects of a magnetically self-shielded speaker box for a mobile device as described with reference to the previous FIGS. 1 to 11.

FIG. 12 illustrates an example system 1200 that includes an example device 1202, which can be implemented as any wireless network device (e.g., electronic device 102, the mobile device 302, or other target device) that implement aspects of a magnetically self-shielded speaker box for a mobile device as described with reference to the previous FIGS. 1 to 11. The example device 1202 may be any type of computing device, client device, mobile phone, tablet, communication, entertainment, gaming, media playback, and/or other type of device. Further, the example device 1202 may be implemented as any other type of wireless network device that is configured for communication on a network, such as a thermostat, hazard detector, camera, lighting unit, commissioning device, router, border router, joiner router, joining device, end device, leader, or access point, and/or other wireless network devices.

The device 1202 includes communication devices 1204 that enable wired and/or wireless communication of device data 1206, such as data that is communicated between devices in a network, data that is being received, data scheduled for broadcast, data packets of the data, data that is synchronized between the communication devices 1204, etc. The device data 1206 can include any type of communication data, as well as audio, video, and/or image data that is generated by applications executing on the device 1202. The communication devices 1204 can also include transceivers for cellular phone communication and/or for network data communication.

The device 1202 also includes input/output (I/O) interfaces 1208, such as data network interfaces (e.g., network interface 212) that provide connection and/or communication links between the device 1202, data networks (e.g., a HAN, external network, etc.), and other devices. The I/O interfaces 1208 can be used to couple the device 1202 to any type of components, peripherals, and/or accessory devices. The I/O interfaces 1208 also include data input ports via which any type of data, media content, and/or inputs can be received, such as user inputs to the device 1202, as well as any type of communication data, as well as audio, video, and/or image data received from any content and/or data source.

The device 1202 includes a processing system 1210 (e.g., processors 204) that may be implemented at least partially in hardware, such as with any type of microprocessors, controllers, and the like that process executable instructions. The processing system can include components of an IC, a programmable logic device, a logic device formed using one or more semiconductors, and other implementations in silicon and/or hardware, such as a processor and memory system implemented as an SoC. Alternatively or in addition, the device 1202 can be implemented with any one or combination of software, hardware, firmware, or fixed logic circuitry that may be implemented with processing and control circuits. The device 1202 may further include any type of a system bus or other data and command transfer system that couples the various components within the device 1202. A system bus can include any one or combination of different bus structures and architectures, as well as control and data lines.

The device 1202 also includes computer-readable storage memory 1212 (e.g., CRM 206), such as data storage devices that can be accessed by a computing device and that provide persistent storage of data and executable instructions (e.g., software applications, modules, programs, functions, and the like). The computer-readable storage memory 1212 described herein excludes propagating signals. Examples of computer-readable storage memory include volatile memory and non-volatile memory, fixed and removable media devices, and any suitable memory device or electronic data storage that maintains data for computing device access. The computer-readable storage memory 1212 can include various implementations of random access memory (RAM), read-only memory (ROM), flash memory, erasable programmable read-only memory (EPROM), electrically erasable programmable read-only memory (EEPROM), and other types of storage memory in various memory device configurations.

The computer-readable storage memory 1212 provides storage of the device data 1206 and various device applications 1214 (e.g., applications 208), such as an operating system (e.g., operating system 210) that is maintained as a software application with the computer-readable storage memory 1212 and executed by the processing system 1210. The device applications 1214 may also include a device manager, such as any form of a control application, a software application, a signal processing and control module, code that is native to a particular device, a hardware abstraction layer for a particular device, and so on.

The device 1202 also includes an audio and/or video system 1216 that generates audio data for an audio device 1218 and/or generates display data for a display device 1220 (e.g., display 220). The audio device 1218 and/or the display device 1220 include any devices that process, display, and/or otherwise render audio, video, display, and/or image data, such as image content of a digital photo. In implementations, the audio device 1218 and/or the display device 1220 are integrated components of the example device 1202. Alternatively, the audio device 1218 and/or the display device 1220 are external, peripheral components to the example device 1202. In aspects, at least part of the techniques described for a magnetically self-shielded speaker box for a mobile device may be implemented in a distributed system, such as over a "cloud" 1222 in a platform 1224. The cloud 1222 includes and/or is representative of the platform 1224 for services 1226 and/or resources 1228.

The platform 1224 abstracts underlying functionality of hardware, such as server devices (e.g., included in the services 1226) and/or software resources (e.g., included as the resources 1228), and connects the example device 1202 with other devices, servers, etc. The resources 1228 may also include applications and/or data that can be utilized while computer processing is executed on servers that are remote from the example device 1202. Additionally, the services 1226 and/or the resources 1228 may facilitate subscriber network services, such as over the Internet, a cellular network, or a Wi-Fi network. The platform 1224 may also serve to abstract and scale resources to service a demand for the resources 1228 that are implemented via the platform 1224, such as in an interconnected device aspect with functionality distributed throughout the system 1200. For example, the functionality may be implemented in part at the example device 1202 as well as via the platform 1224 that abstracts functionality of the cloud 1222.

Some examples are described below:

Example 1: A mobile device comprising: a camera module having a voice coil motor with one or more magnets, the voice coil motor configured to provide an auto-focus functionality for the camera module; and a microspeaker module located in proximity to the camera module within a range of 0.5 to 3.5 millimeters, the microspeaker module including: a magnetically self-shielded speaker box; and a speaker driver housed within the magnetically self-shielded speaker box.

Example 2: The mobile device of Example 1, wherein: the mobile device is a smartphone; the microspeaker module is an earpiece speaker for the mobile device; and the camera module is a front-facing camera or a rear-facing camera.

Example 3: The mobile device of Example 1 or Example 2, wherein at least one of: the mobile device has first, second, and third axes, the first axis corresponding to a length, the second axis corresponding to a width, the third axis corresponding to a depth, the length greater than the width, the width greater than the depth; the third axis intersects front and rear sides of the mobile device; the microspeaker module has a front side for providing a frontward sound wave and a rear side for providing a backward sound wave; and the front side of the microspeaker module faces a back of a display of the mobile device.

Example 4: The mobile device of any one of Examples 1 to 3, further comprising at least one of: one or more antennas; and an additional microspeaker module located proximate to the one or more antennas, and optionally wherein the additional microspeaker module has a low magnetic permeability that is less than 100 Henry per meter.

Example 5: The mobile device of any one of Examples 1 to 4, wherein the speaker driver is a 10 millimeter by 12 millimeter transducer.

Example 6: The mobile device of any one of Examples 1 to 5, further comprising one or more additional camera modules located in proximity to the microspeaker module within a range of 0.5 to 3.5 millimeters, and optionally wherein the one or more additional camera modules are rear-facing cameras.

Example 7: The mobile device of any one of Examples 1 to 6, wherein: the magnetically self-shielded speaker box includes an enclosure having a high magnetic permeability that is greater than 500 Henry per meter to reduce penetration of a magnetic field through the enclosure; and/or the speaker driver is configured to generate audio signals and the magnetic field in a back volume between the speaker driver and the enclosure.

Example 8: The mobile device of Example 7, wherein the speaker driver is supported within the enclosure of the magnetically self-shielded speaker box by a plastic internal bracket.

Example 9: The mobile device of Example 7 or Example 8, wherein the enclosure defines an opening in a wall of the enclosure for passage of frontward sound waves output by the speaker driver.

Example 10: The mobile device of Example 9, further comprising a pressure-sensitive adhesive audio seal disposed on an exterior surface of the wall of the enclosure.

Example 11: The mobile device of Example 10, further comprising conductive pressure-sensitive adhesive disposed on the exterior surface of the wall for grounding.

Example 12: The mobile device of any one of Examples 7 to 11, wherein the enclosure has a magnetic permeability in a range of 600 to 1100 Henry per meter.

Example 13: The mobile device of any one of Examples 7 to 12, wherein the enclosure is made of stainless steel.

Example 14: The mobile device of any one of Examples 7 to 13, wherein the enclosure includes at least two enclosure members joined together by a continuous welded seam.

Example 15: The mobile device of any one of Examples 7 to 14, wherein the enclosure includes a thickness that is within a range of 0.3 mm to 0.1 mm.

Example 16: The mobile device of any one of Examples 7 to 14, wherein the enclosure include a vent (e.g., a barometric vent). The vent may be form equalizing the pressure (e.g., barometric pressure) between the exterior and interior of the enclosure.

CONCLUSION

Although aspects of magnetically self-shielded speaker box for a mobile device have been described in language specific to features and/or methods, the subject of the appended claims is not necessarily limited to the specific features or methods described. Rather, the specific features and methods are disclosed as example implementations of the techniques for magnetically self-shielded speaker box for a mobile device, and other equivalent features and methods are intended to be within the scope of the appended claims. Further, various aspects are described, and it is to be appreciated that each described aspect can be implemented independently or in connection with one or more other described aspects.

What is claimed is:
1. A mobile device comprising:
a camera module having a voice coil motor with one or more magnets, the voice coil motor configured to provide an auto-focus functionality for the camera module; and
a microspeaker module located in proximity to the camera module within a range of 0.5 to 3.5 millimeters, the microspeaker module including:
a magnetically self-shielded speaker box; and
a speaker driver housed within the magnetically self-shielded speaker box.
2. The mobile device of claim 1, wherein:
the mobile device is a smartphone;
the microspeaker module is an earpiece speaker for the mobile device; and
the camera module is a front-facing camera or a rear-facing camera.
3. The mobile device of claim 1, wherein:
the mobile device has first, second, and third axes, the first axis corresponding to a length, the second axis corresponding to a width, the third axis corresponding to a depth, the length greater than the width, the width greater than the depth;
the third axis intersects front and rear sides of the mobile device;
the microspeaker module has a front side for providing a frontward sound wave and a rear side for providing a backward sound wave; and
the front side of the microspeaker module faces a back of a display of the mobile device.
4. The mobile device of claim 1, further comprising:
one or more antennas; and
an additional microspeaker module located proximate to the one or more antennas, the additional microspeaker module having a low magnetic permeability that is less than 100 Henry per meter.
5. The mobile device of claim 1, wherein the speaker driver is a 10 millimeter by 12 millimeter transducer.
6. The mobile device of claim 1, further comprising one or more additional camera modules located in proximity to the microspeaker module within a range of 0.5 to 3.5 millimeters, wherein the one or more additional camera modules are rear-facing cameras.
7. The mobile device of claim 1, wherein:
the magnetically self-shielded speaker box includes an enclosure having a high magnetic permeability that is greater than 500 Henry per meter to reduce penetration of a magnetic field through the enclosure; and
the speaker driver is configured to generate audio signals and the magnetic field in a back volume, the back volume being an empty volume between the speaker driver and an interior surface of the enclosure.
8. The mobile device of claim 7, wherein the speaker driver is supported within the enclosure of the magnetically self-shielded speaker box by a plastic internal bracket.
9. The mobile device of claim 7, wherein the enclosure defines an opening in a wall of the enclosure for passage of frontward sound waves output by the speaker driver.
10. The mobile device of claim 9, further comprising a pressure-sensitive adhesive audio seal disposed on an exterior surface of the wall of the enclosure.
11. The mobile device of claim 10, further comprising conductive pressure-sensitive adhesive disposed on the exterior surface of the wall for grounding.
12. The mobile device of claim 7, wherein the enclosure has a magnetic permeability in a range of 600 to 1100 Henry per meter.
13. The mobile device of claim 7, wherein the enclosure is made of stainless steel.
14. The mobile device of claim 7, wherein the enclosure includes at least two enclosure members joined together by a continuous welded seam.
15. The mobile device of claim 7, wherein the enclosure includes a thickness that is within a range of 0.3 mm to 0.1 mm.
16. The mobile device of claim 7, wherein the enclosure includes a vent, the vent configured to equalize pressure between an exterior of the enclosure and an interior of the enclosure.
17. An electronic device comprising:
a camera module having a voice coil motor with one or more magnets, the voice coil motor configured to provide an auto-focus functionality for the camera module; and
a microspeaker module located in proximity to the camera module within a range of 0.5 to 3.5 millimeters, the microspeaker module including:
a transducer configured to generate audio signals and a transducer-generated magnetic field; and
a magnetically self-shielded speaker box, the magnetically self-shielded speaker box including walls forming a speaker enclosure, the speaker enclosure housing the transducer in a manner that includes an empty volume between a rear of the transducer and an interior surface of the speaker enclosure, the magnetically self-shielded speaker box configured to reduce magnetic flux of the transducer-generated magnetic field from penetrating beyond the walls of speaker enclosure.
18. The electronic device of claim 17, wherein the speaker enclosure includes a high magnetic permeability that is greater than 500 Henry per meter and a thickness that is within a range of 0.3 mm to 0.1 mm.
19. The electronic device of claim 17, wherein the speaker enclosure defines an opening in one of the walls of the enclosure for passage of frontward sound waves output by the transducer.

20. The electronic device of claim 17, wherein:

the electronic device is a smartphone;

the microspeaker module is an earpiece speaker for the electronic device; and the camera module is a front-facing camera or a rear-facing camera.

* * * * *